(12) United States Patent
Kenny et al.

(10) Patent No.: US 6,238,167 B1
(45) Date of Patent: May 29, 2001

(54) OVER-CENTER EJECTOR BLADE LOCK

(75) Inventors: Peter M. Kenny, Sunderland (GB); Peter F. Prillinger, Dunlap, IL (US); David A. Young, Sunderland (GB)

(73) Assignee: Caterpillar S.A.R.L., Geneva (CH)

( * ) Notice: Subject to any disclaimer, the term of this patent is extended or adjusted under 35 U.S.C. 154(b) by 0 days.

(21) Appl. No.: 09/272,147

(22) Filed: Mar. 19, 1999

(51) Int. Cl.⁷ ........................................................ B60P 1/00
(52) U.S. Cl. .................. 414/517; 414/525.6; 414/813
(58) Field of Search .................. 414/492, 509, 414/511, 513, 517, 525.2, 525.6, 679, 813; 298/23 A, 23 B, 23 F; 100/219; 70/DIG. 52, DIG. 53

(56) References Cited

U.S. PATENT DOCUMENTS

| | | | |
|---|---|---|---|
| 1,735,065 | * 11/1929 | Walsh et al. | 298/23 F |
| 2,696,313 | 12/1954 | Gudikunst . | |
| 2,712,388 | 7/1955 | Skromme et al. . | |
| 2,954,995 | * 10/1960 | Grise | 298/23 B |
| 2,996,203 | * 8/1961 | Rosaia | 414/679 X |
| 3,137,400 | 6/1964 | Tapp et al. . | |
| 3,252,602 | 5/1966 | Bowles . | |
| 3,422,973 | 1/1969 | Longman . | |
| 3,648,868 | * 3/1972 | Richler | 414/679 X |
| 3,901,394 | 8/1975 | Bowles . | |
| 3,921,832 | * 11/1975 | Smith | 414/509 |
| 4,011,957 | 3/1977 | Bendtsen . | |
| 4,044,914 | 8/1977 | Hopkins et al. | 220/93 |
| 4,576,540 | 3/1986 | Derain et al. | 414/511 |
| 4,627,783 | 12/1986 | De Filippi | 414/517 |
| 5,314,290 | 5/1994 | Lutz et al. | 414/509 |
| 5,456,521 | 10/1995 | Moyna | 298/1 B |
| 5,816,766 | * 10/1998 | Clark | 414/511 X |
| 5,938,393 | * 8/1999 | Georg | 414/492 X |

FOREIGN PATENT DOCUMENTS

| | | | |
|---|---|---|---|
| 403629 | * 6/1966 | (CH) | 414/509 |
| 2212131 | * 7/1989 | (GB) | 414/517 |
| 36133 | * 3/1980 | (JP) | 298/23 A |
| 55027 | * 4/1980 | (JP) | 298/23 A |

* cited by examiner

Primary Examiner—James W. Keenan
(74) Attorney, Agent, or Firm—Hancock & Estabrook, LLP; James R. Smith

(57) ABSTRACT

An over-center ejector blade retaining system which automatically locks the ejector blade in a loading position when the ejector blade has been retracted into the load position by operation of the hydraulic cylinder or ram to which it is attached. Movement of the ejector blade into the load position rotates a lock plate attached to the vehicle body into engagement with a locking roller attached to the ejector blade thereby compressing a spring attached to the lock plate. Upon movement of the connection between the lock plate and the spring over the center of rotation of the lock plate, the compressive force on the spring is released and the ejector blade held in the load position. When the ejector blade is moved from the load position to discharge materials, the process is reversed and the lock plate held in an open position for again receiving the locking rollers upon the return of the ejector blade to the load position.

9 Claims, 4 Drawing Sheets

Fig_4_

OVER-CENTER EJECTOR BLADE LOCK

TECHNICAL FIELD

This invention relates to a system for retaining an ejector blade, used in unloading material carried in a vehicle, in a secured load position when the ejector blade is not being used to remove material from the vehicle and, more particularly, to an ejector blade retaining system which locks the ejector blade in a fixed position when the ejector blade is moved into a load position, and retains the ejector blade in the load position until such time as the ejector blade is moved out from the load position to eject material from the vehicle.

BACKGROUND ART

Vehicles using ejector blades to remove material carried within the vehicle are well known, and the ejector blades of such vehicles are connected to a hydraulic cylinder or ram which is used to move the ejector blade from a load position to a discharge position for removing the material from the vehicle. When the ejector blade is in the load position, material may be freely loaded into the vehicle for transport to another location. When the ejector blade is moved from the load position towards the discharge position, materials loaded into the vehicle are discharged therefrom by the ejector blade pushing the materials from the body of the vehicle out through an unloading gate.

Because the ejector blade is secured to the hydraulic cylinder or ram for movement with the piston portion thereof, it has been experienced that when a vehicle such as an off-highway truck is traveling unloaded over rough and uneven terrain, the hydraulic cylinder will sometimes become partially extended. This unwanted extension of the hydraulic cylinder is referred to as cylinder "move out". Such cylinder "move out" can result in damage to the hydraulic cylinder during subsequent loading operation, and the resultant movement of the ejector blade out from the load position during loading of the vehicle can result in the ejector blade being twisted during loading operations damaging the ejector blade and/or the hydraulic cylinder to which it is attached.

In U.S. Pat. No. 5,456,521, there is disclosed one attempt to overcome the problem of the ejector blade not being held or locked in the load position for use with an off-highway dump truck body. To this end, a pair of U-shaped brackets are used to engage a pair of pins secured to the carriage of the ejector blade when the ejector blade is in the load position. The U-shaped brackets are rotated to disengage the pins by operation of the hydraulic cylinders which are actuated in conjunction with the tilting of the body for dumping and thereby release the ejector blade so that it scrapes and cleans the inside of the truck body as the ejector blade moves towards the unloading gate.

In U.S. Pat. No. 4,576,540, there is disclosed another system for retaining an ejecting mechanism in a load position which utilizes electrically controlled solenoids to actuate tipping or tripping locks which retain the ejector mechanisms in a load position until such time as they are used to discharge material from the vehicle.

This invention is directed to overcoming one or more of the problems or concerns set forth above.

DISCLOSURE OF THE INVENTION

In the preferred embodiment of this invention, an ejector blade retaining system automatically locks the ejector blade in the loading position when the ejector blade has been retracted into the load position by operation of the hydraulic cylinder or ram to which it is attached. A pair of over-center ejector blade locking mechanisms are positioned, one on each side of the vehicle interior, to engage a lock roller carried by a pair of brackets secured one on each side of the ejector blade adjacent to the vehicle side walls. The use of a pair of over-center ejector blade locks positioned one on each side of the vehicle interior is preferred, in order to provide a positive locking of the ejector blade against racking forces when in the load position. As is known, when loading large unitary masses of materials such as broken portions of reinforced concrete or large rocks, if such materials are not centrally loaded, but loaded against one side of the ejector blade, racking forces occur which can damage the hydraulic cylinder and ejector roller system. By utilizing the over-center ejector blade locks in pairs, there is provided a positive stop or lock of each side of the ejector blade against the transmission of such racking forces which might otherwise occur during off-center loading.

The over-center ejector blade locks are engaged by the lock rollers when the ejector blade is retracted to its load position. The lock rollers engage the bight of a lock plate, causing the lock plate to rotate in a first direction about a pivot point, and compresses a compression spring as the lock plate continues to rotate in the first direction. Continued rotation of the lock plate in the first direction moves the connecting point between the lock plate and the compression spring over-center of the lock plate pivot point whereby the spring force will be released biasing the lock plate into a lock position and thereby holding the ejector blade in the load position until such time as it is desired to unload the vehicle.

When the hydraulic cylinder or ram is extended to move the ejector blade out from the load position to discharge material from the vehicle, the movement of the ejector blade outwardly from the load position will cause the lock plate to rotate in the opposite direction, thereby again compressing the compression spring until such time as the lock plate has been pivoted into a position wherein the connection between the lock plate and the compression spring again passes over-center. Upon passing over-center, the compression spring force is released and the lock plate will be held in an open position for reengaging the lock rollers to again hold the ejector blade in the load position when the hydraulic cylinder or ram has been retracted.

Related methods and other features and other advantages of the present invention will be apparent from the following description and the accompanying drawings.

BEST MODE FOR CARRYING OUT THE INVENTION

Figure 1:
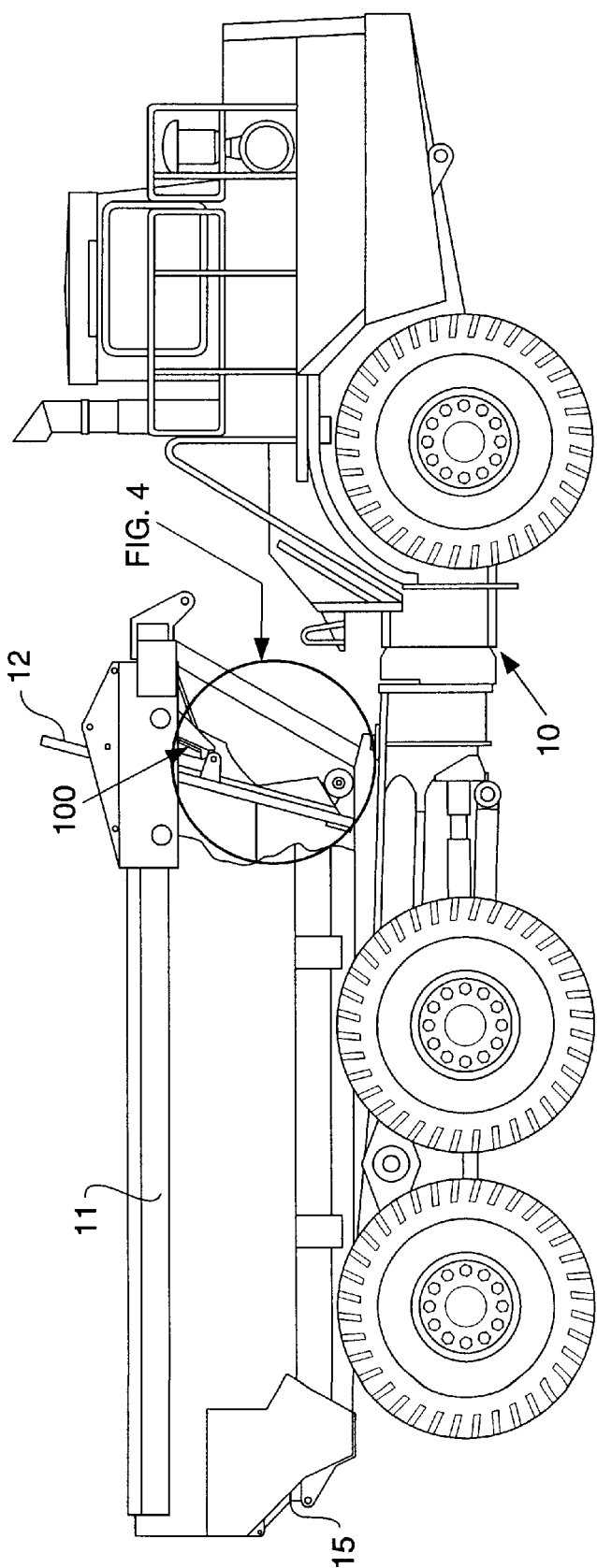
FIG. 1 is a side elevation view of an exemplary vehicle, an off-highway truck, having an ejector blade to facilitate discharge of the materials carried within the truck body and with which this invention is used.

Referring to FIG. 1, this invention is illustrated with respect to its use in a construction work machine, such as an articulated off-highway truck 10. It will be understood, however, that the use of this invention is equally applicable to any other vehicle which utilizes an ejector blade to assist in the removal of materials carried by the vehicle, as well as off-highway trucks.

In general, the truck 10 includes a truck body portion 11 into which materials are loaded to be carried by the truck to another location whereat the materials are discharged. To assist in the discharge of the materials carried in the truck body 11, an ejector blade 12 is used to push the materials from the truck body 11 through an unloading gate 15 at the rear of the vehicle truck body. To this end, the ejector blade 12 is first moved to a load position, at the forward end of the truck body 11, and the materials to be transported are placed into and fill the truck body 11. When these materials have been transported to a desired location, the unloading gate 15 at the rear of the truck body is opened, and the ejector blade 12 is moved from the load position at the front of the truck body to a discharge position adjacent to the unloading gate 15 by operation of a hydraulic ram (not shown), as is known to those skilled in the art.

The over-center ejector blade lock 100 is best illustrated in FIGS. 2–5. While a pair of such lock mechanisms 100 are preferably used, one on each side of the vehicle interior, for convenience of illustration only one such ejector blade lock needs to be described in detail.

Figure 2:
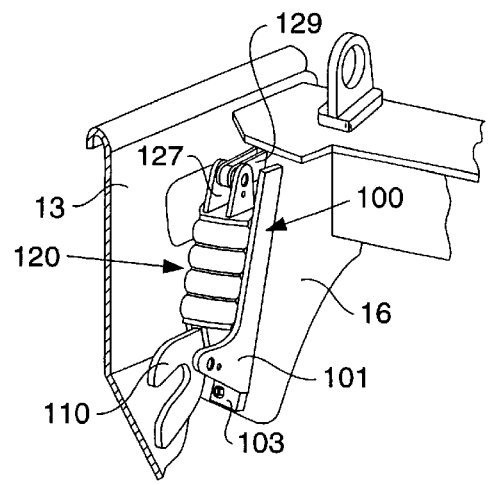
FIG. 2 is a partial perspective view of a portion of the vehicle body of FIG. 1 incorporating the over-center ejector blade lock system for retaining the ejector blade in the load position.

As best illustrated in FIG. 2, the over-center ejector blade lock 100 is secured to a portion of the vehicle interior adjacent to the interior side wall 13 at the forward portion of the truck body. The over-center lock 100 includes a substantially L-shaped bracket 101 extending outwardly from a base plate 103, to which the bracket 101 is fixedly secured, as by welding, and the base plate 103 is connected to a forward portion 16 of the vehicle body 11. A pivotal lock plate 110 has a bight portion for receiving a locking roller 130 carried by a bracket 131 fixedly secured, as by welding, to the ejector blade 12. The lock plate 110 is pivotally supported by the L-shaped bracket 101 for rotational movement about pivot point 112 to function in a manner hereinafter described in detail.

A compression spring 120 comprising a series of polyurethane disk springs 121 separated by steel interleaves 122, is pivotally connected to an end portion of the lock plate 110 by a clevis bracket 125 at a pivot connection 115 which permits the lock plate 110 to pivot relative to the clevis bracket 125 and the compression spring 120.

The opposite end of the compression spring 120 is pivotally connected by a similar clevis bracket 127 to another clevis 129 connected to and supported from the base plate 103. The spring rate of the spring 120 can be adjusted to control the compressibility of the spring by a threaded connection 123 which extends through the spring disks 121 and the steel interleaves 122 in a manner known to those skilled in the art.

Figure 5:
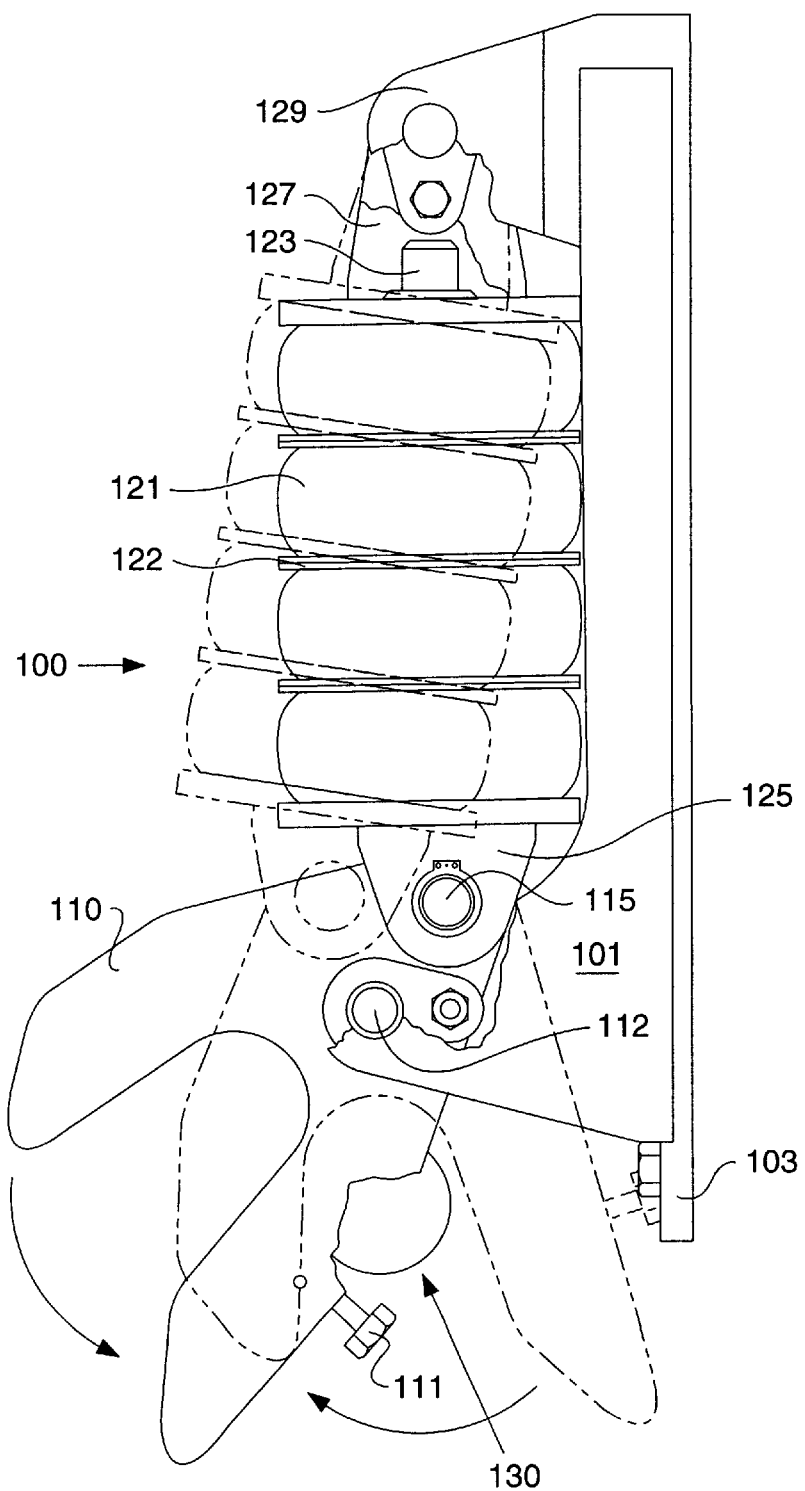
FIG. 5 is an enlarged side profile view of the over-center ejector blade lock mechanism to better illustrate the manner in which the lock functions to retain the ejector blade in the load position and is held in a position for retaining the ejector blade upon completion of a discharge cycle.

As is best illustrated in FIG. 5, the positioning of the pivotal connection 115 between the clevis 125 and the lock plate 110 relative to the pivotal connection 112 between the lock plate 110 and the L-shaped bracket 101, results in the spring 120 being compressed as the lock plate 110 is rotated from a position for receiving the roller 130 (shown in solid lines of FIG. 5) to a position wherein the pivot connection 115 passes over-center relative to the pivot point 112 thereby releasing the spring force to retain the roller within the bight of the lock plate 110 (illustrated in phantom in FIG. 5).

Industrial Applicability

Figure 3:
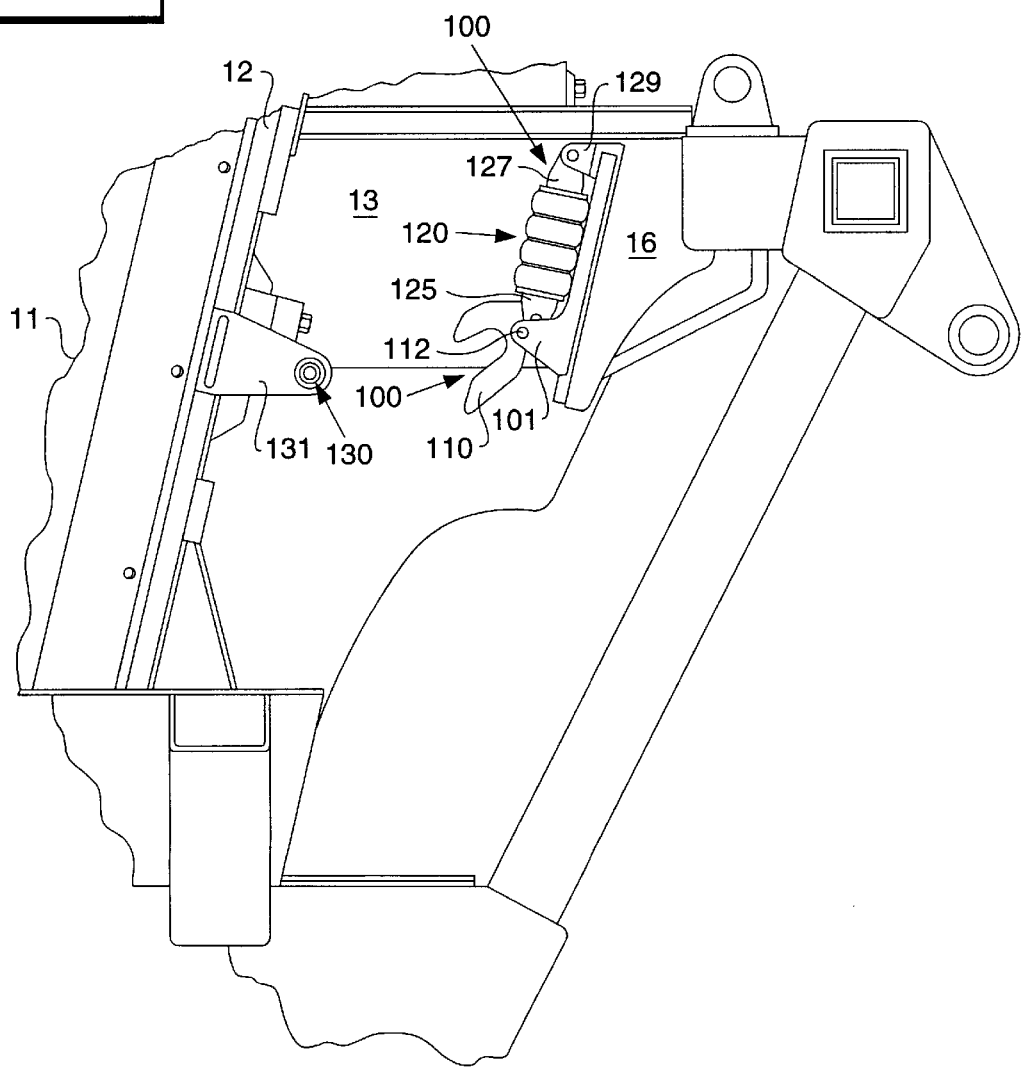
FIG. 3 is a partial side elevation view of the truck body illustrated in FIG. 1, with portions removed, to illustrate the over-center ejector blade lock system in a position for receiving a coupling portion thereof carried on the ejector blade, when the ejector blade is moved into a load position.
Figure 4:
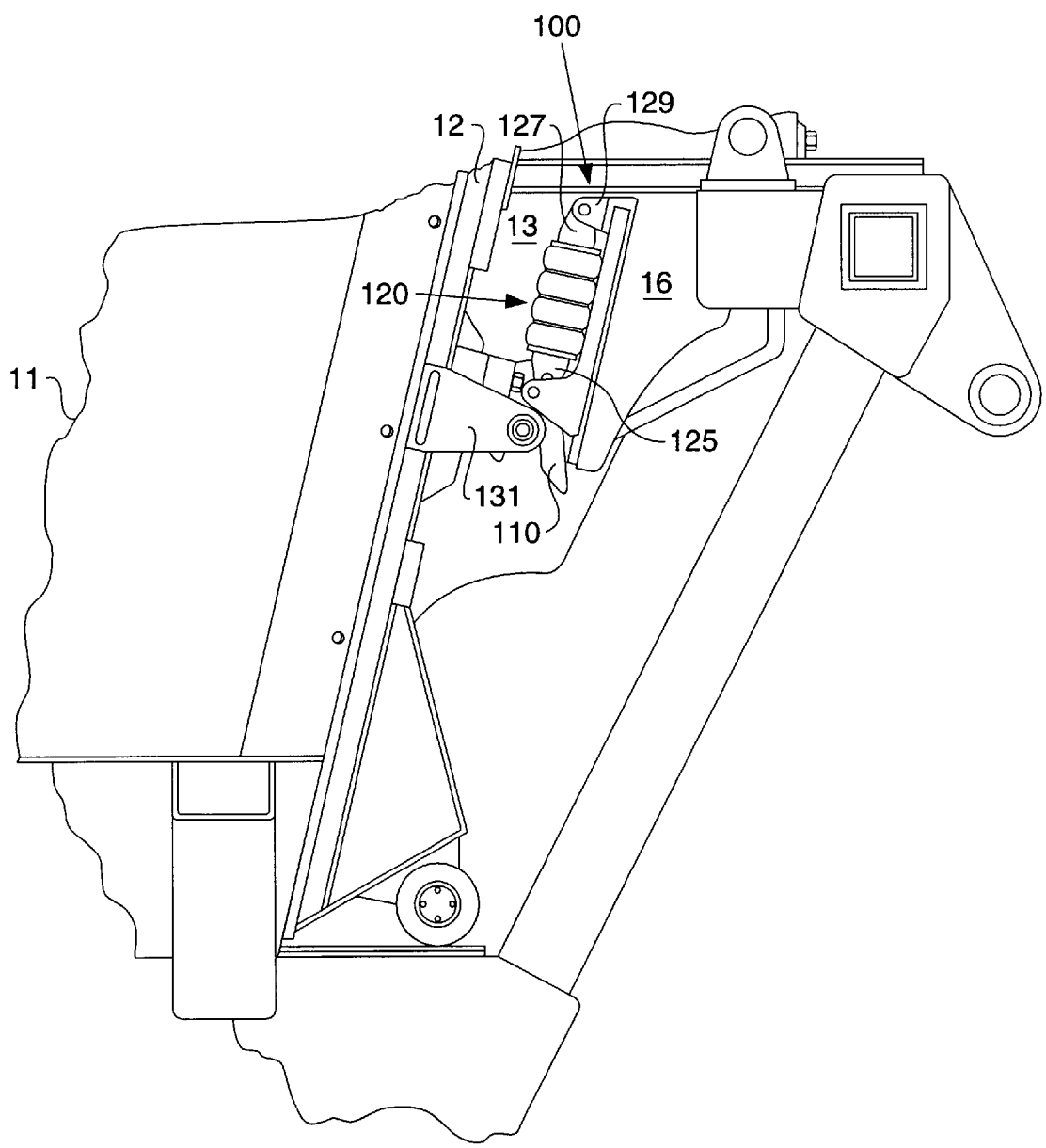
FIG. 4 is a side elevational view of a portion of a truck body as illustrated in FIG. 1, to illustrate the engagement of the over-center ejector blade lock portions when retaining the ejector blade in the load position.

In operation, the ejector blade lock 100 serves to secure the ejector blade 12 in the load position to prevent damage to the ejector blade and/or the hydraulic ram which can occur when the ejector blade 12 unintentionally moves out from the load position, such as occurs during "move out" of the hydraulic ram, and the truck body 11 is loaded when the ejector blade 12 is not in the load position. In order to actuate the over-center ejector blade lock 100, when the ejector blade 12 has been moved to the discharge position, and is returning to the load position moving in the direction shown by the arrow in FIG. 3, the lock plate 110 has been pivoted into the position illustrated in FIG. 3, and as shown by the solid lines of FIG. 5. The bight of the lock plate 110 is facing towards the lock roller 130 which is secured to the ejector blade 12 by means of the bracket 131. As the ejector blade 12 moves into the load position, the locking roller 130 passes into the bight portion of the lock plate 110 and causes the lock plate 110 to pivot in a counterclockwise direction as seen in FIGS. 3 and 5.

As best illustrated in FIG. 5, the counterclockwise pivotal movement of the lock plate 110 about the pivot point 112 will retain the lock roller 130 in the bight portion of the lock plate 110. As the ejector blade 12 continues to move in the direction of the arrow illustrated in FIGS. 3 and 4, the lock plate 110 will continue to pivot in a counterclockwise direction compressing the spring 120 and moving the pivotal connection 115 between the spring 120 and the lock plate 110 over-center of the lock plate pivot point 112. When the pivot connection 115 passes over-center, compression force on the spring 120 is released, pivoting the lock plate 110 to its lock position for retaining the ejector blade 12 in the load position, illustrated in FIG. 4 and in phantom in FIG. 5. An adjustable stop 111 is secured to the lock plate 110 to adjust the lock position.

After the truck body 11 has been loaded with material, and it is desired to discharge the material with the assistance of the ejector blade 12, the hydraulic ram is actuated. The force applied to the ejector blade 12 through the hydraulic ram is sufficient to rotate the lock plate 110 in a clockwise direction against the spring 120, compressing the spring 120 and, when the connection point 115 between the spring 120 and the lock plate 110 passes over-center of the lock plate pivot point 112, the compressive force on the spring is again released, and the lock plate 110 is again held in the open position as illustrated by the solid lines in FIG. 5 and as shown in FIG. 3. The lock plate 11 is again held ready to engage and retain the lock roller 110 when the ejector blade 12 is returned to the load position.

While this invention is described and shown for use with an articulated off-highway truck, it is to be understood that the invention could be adapted to function just as well with other vehicles utilizing a moveable blade for facilitating the discharge of materials carried by the vehicle. This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims:

What is claimed is:

1. An ejector blade locking system for releasably holding a moveable ejector blade of a material transporting vehicle in a load position until such time as said ejector blade is moved out from said load position to discharge material from the vehicle, comprising:

an ejector blade having an ejector blade lock engaging member extending outwardly from said ejector blade for engaging a complementary receiver portion of an ejector blade lock;

a complementary receiver portion of an ejector blade lock pivotally supported from the vehicle about a center of rotation for pivotal movement between an open position for receiving said ejector blade lock engaging member, and a lock position wherein said ejector blade lock engaging member is engaged therewith upon said ejector blade being moved into a load position; and a resilient member connected at one end to said pivotal complementary receiver portion of said ejector blade lock for applying a releasable biasing force thereto upon pivotal movement of said pivotal complementary receiver portion of said ejector blade lock and to release said biasing force upon movement over said center of rotation of the connection between said resilient member and said complementary receiver portion of said ejector blade lock to thereby retain said ejector blade in said load position.

2. The ejector blade locking system of claim 1 wherein said resilient member connected at one end to said pivotal complementary receiver portion of said ejector blade lock applies a releasable biasing force thereto upon movement of said ejector blade lock engaging member out from engagement with said complementary receiver portion of said ejector blade lock until said connection between said resilient member and said complementary receiver portion of said ejector blade lock moves over said center of rotation of said complementary receiver portion of said ejector blade lock to thereby hold said complementary receiver portion of said ejector blade lock in said open position for receiving said ejector blade lock engaging member upon return of said ejector blade to said load position.

3. The ejector blade locking system of claim 2 wherein an ejector blade locking system is positioned on each side of the vehicle interior to engage both sides of an ejector blade for retaining each end of the ejector blade in a load position.

4. The ejector blade locking system of claim 1 wherein said ejector blade lock engaging member comprises a locking roller carried by a bracket fixedly secured to said ejector blade; and said complementary receiver portion of said ejector blade lock comprises a pivotal lock plate having a bight portion for receiving said locking roller for effecting pivotal movement of said lock plate about a center of rotation in response to the movement of the locking roller into the bight portion of the lock plate.

5. The ejector blade locking system of claim 4 wherein said resilient member connected at one end to said lock plate comprises a compression spring having a series of polyurethane disk springs separated by steel interleaves; and said compression spring is connected to a portion of said lock plate such that the pivotal movement of said lock plate about its center of rotation will cause the connection point between said compression spring and said lock plate to move over the center of said center of rotation thereby increasing the spring force as the connection moves to the over-center position and decreasing the spring force as the pivotal movement of the lock plate moves the connection over-center.

6. The ejector blade locking system of claim 5 further including an adjustable stop member carried by said lock plate and positioned to engage the vehicle for limiting the rotational movement of the lock plate when retaining said ejector blade in said load position.

7. The ejector blade locking system of claim 6 further including a spring rate adjuster carried by said compression spring to control the compressibility of the spring.

8. A method of releasably retaining an ejector blade of a material transporting vehicle in a load position until said ejector blade is moved out from said load position to discharge materials from the vehicle, comprising:

moving an ejector blade having an ejector blade lock engaging member supported thereon towards a load position to engage said ejector blade lock engaging member with an open complementary receiver portion of an ejector blade lock carried by the vehicle to retain said ejector blade in said load position;

providing a complementary receiver portion of said ejector blade lock carried by a vehicle and pivotally supported about a center of rotation for pivotal movement between an open position for receiving said ejector blade lock engaging member and a lock position for locking said ejector blade in said load position;

providing a resilient biasing force applying member coupled at a coupling point to said complementary receiver portion of said ejector blade lock at a position for applying a biasing force against the pivotal movement of said complementary receiver portion of said ejector blade lock until said coupling point of said resilient biasing force applying member to said complementary receiver portion of said ejector blade lock passes over said center of rotation of said complementary receiver portion of said ejector blade lock;

said resilient biasing force applying member applying an increasing biasing force against the pivotal movement of said complementary receiver portion of said ejector blade lock as said ejector blade lock engaging member moves into engagement therewith, and as said complementary receiver portion of said ejector blade lock rotates a coupling point of said resilient biasing force applying member to said complementary receiver portion of said ejector blade lock to said center of rotation of said complementary receiver portion of said ejector blade lock; and releasing said biasing force applied to said complementary receiver portion of said ejector blade lock upon the passing of said coupling point over said center of rotation to thereby lock said ejector blade in said load position.

9. The method of claim 8 further including:

moving said ejector blade lock engaging member supported on said ejector blade out from engagement with said complementary receiver portion of said ejector blade lock when said ejector blade is moved out from said load position;

said movement of said ejector blade lock engaging member out from engagement with said complementary receiver portion of said ejector blade lock pivoting said complementary receiver portion of said ejector blade lock about said center of rotation thereof;

said rotational movement of said complementary receiver portion of said ejector blade lock about said center of rotation causing said resilient biasing force applying member to apply a biasing force against said pivotal movement of said complementary receiver portion of said ejector blade lock as said ejector blade lock engaging member moves out from engagement therewith; and reducing said biasing force applied against said pivotal movement as said complementary receiver portion of said ejector blade lock rotates said coupling point of said resilient biasing force applying member to said complementary receiver portion of said ejector blade lock over said center of rotation of said complementary receiver portion of said ejector blade lock thereby holding said complementary receiver portion of said ejector blade lock in an open position for receiving said ejector blade lock engaging member upon return of said ejector blade to said load position.

* * * * *